United States Patent
Grosch et al.

(10) Patent No.: US 9,547,296 B2
(45) Date of Patent: Jan. 17, 2017

(54) METHOD FOR OPERATING AN INDUSTRIAL CONTROLLER AND INDUSTRIAL CONTROLLER

(71) Applicants: Thomas Grosch, Rosstal (DE); Jan Richter, Lauf a. d. Pegnitz (DE)

(72) Inventors: Thomas Grosch, Rosstal (DE); Jan Richter, Lauf a. d. Pegnitz (DE)

(73) Assignee: Siemens Aktiengesellschaft, Munich (DE)

( * ) Notice: Subject to any disclaimer, the term of this patent is extended or adjusted under 35 U.S.C. 154(b) by 429 days.

(21) Appl. No.: 14/206,759

(22) Filed: Mar. 12, 2014

(65) Prior Publication Data

US 2014/0316578 A1 Oct. 23, 2014

(30) Foreign Application Priority Data

Mar. 13, 2013 (EP) .................................... 13158931

(51) Int. Cl.
| | | |
|---|---|---|
| G05B 19/042 | (2006.01) | |
| G06F 9/50 | (2006.01) | |
| G06F 9/48 | (2006.01) | |

(52) U.S. Cl.
CPC ......... *G05B 19/0421* (2013.01); *G06F 9/4893* (2013.01); *G06F 9/5094* (2013.01); *G05B 2219/2207* (2013.01); *Y02B 60/142* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 2009/0249094 A1* | 10/2009 | Marshall | ............... | G06F 1/3203 713/320 |
| 2012/0144217 A1* | 6/2012 | Sistla | ................... | G06F 1/3228 713/320 |
| 2013/0218299 A1* | 8/2013 | Jie | ...................... | G05B 19/0421 700/4 |

FOREIGN PATENT DOCUMENTS

| | | |
|---|---|---|
| EP | 2 469 377 A2 | 6/2012 |
| EP | 2 477 085 A1 | 7/2012 |
| WO | WO 2009120427 A1 | 10/2009 |
| WO | WO 2012112302 A2 | 8/2012 |

(Continued)

*Primary Examiner* — Sean Shechtman
*Assistant Examiner* — Steven Garland
(74) *Attorney, Agent, or Firm* — Cozen O'Connor

(57) ABSTRACT

Regarding a method for operating an industrial controller, a control program executable in a processor that is arranged in the industrial controller is subdivided into a main block and several program blocks. The program blocks are processed under event control that takes a processing priority into consideration. The processor includes a multi-core processor having a plurality of independent sub-processors. The method includes assigning the main block to a first sub-processor, and executing a part program associated with the main block in the first sub-processor. The method also includes assigning each of the several program blocks to the additional sub-processors, and executing the part programs associated with the program blocks in the respective sub-processors. The method further includes operating a control device to evaluate as input variables the processing priority and an event assigned to the respective program block, and switching the sub-processors into active or inactive state using the evaluation.

9 Claims, 1 Drawing Sheet

(56) References Cited

FOREIGN PATENT DOCUMENTS

WO     WO 2013010159 A1     1/2013

\* cited by examiner

METHOD FOR OPERATING AN INDUSTRIAL CONTROLLER AND INDUSTRIAL CONTROLLER

FIELD OF THE INVENTION

The invention relates to a method for operating an industrial controller, with a control program that is executable in a processor being arranged in the industrial controller, and subdivided into a main block and several program blocks, with the program blocks being processed under event control, by taking a processing priority into consideration. The invention furthermore relates to an industrial controller having a processor for an executable control program which is subdivided into a main block and several program blocks, with the program blocks being processed under event control, taking a processing priority into consideration.

DESCRIPTION OF THE RELATED ART

The method for operating an industrial controller and the industrial controller are known from the published patent application EP 2 477 085 A1. An industrial controller is preferably understood to mean a stored program controller (SPC), including an automation device which is used for example for open-loop control or for closed-loop control of a machine or of a plant in an industrial environment. In the case of a cycle-oriented SPC, this cycle is monitored by an operating system permanently stored by the operator. Dependent upon its program blocks, the control program can include branches and conditional calls which load the processor in different ways. The disadvantage with industrial controllers constructed in this manner is that measures for optimizing the energy consumption of the processor during the execution of the control program cannot be implemented.

SUMMARY OF THE INVENTION

An object of the invention is therefore to make improvements to an industrial controller of the prior art so as to facilitate energy-saving operation of the processor. That object is achieved in a method for operating an industrial controller, with a control program executable in a processor that is arranged in the industrial controller, wherein the control program is subdivided into a main block and several program blocks.

The program blocks are processed under event control, taking a processing priority into consideration, so that a multi-core processor having a plurality of separate sub-processors can be used as the processor, wherein a first sub-processor is assigned to the main block and a part program associated with the main block is executed in the main block.

Furthermore, each of the several program modules is assigned to the additional sub-processors and the part programs associated with the program modules are executed in the respective sub-processors, with a control device being operated so that, as input variables, it evaluates the processing priority and an event assigned to the respective program module and, depending on this evaluation, switches the sub-processors into the active or the inactive state.

In the context of the invention, a task is understood to mean a main block, a program block or a function block, each with its assigned part programs. A task includes an implied object and/or solution instruction in the form of computer program statements. The tasks or modules can be processed simultaneously or sequentially, in turn after other modules. The sub-processors are understood to be equal-access cores of a multi-core processor.

According to the method, it is now possible to facilitate energy-saving operation of the industrial controller by utilizing targeted shutdown of individual sub-processors thereby reducing the energy consumption of the industrial controller. In particular, a dedicated sub-processor is preferably assigned to each execution level.

Optimized operation of the industrial controller is achieved by the following mode of operation: first of all, the individual sub-processors are shut down and if, for example, an event occurs (process alarm, watchdog alarm, cyclical trigger alarm), the event causes a specific program module to be started, and to activate consequently the associated sub-processor or execution of the associated part program. The sub-processor can be deactivated again following the execution of the part program.

Advantageously, in addition to the control device, a control device which controls the timed execution of the activation or deactivation of the sub-processors, is implemented in a further method step. Since reference is made to the processing priority for activation or deactivation of the sub-processors, it is useful to create a list in the control device with the processing priorities, wherein the list indicates which program block or which part program is to be processed next in the respective sub-processor. The sub-processors are then enabled or again disabled in sequence.

A further advantageous instance exists when the control device evaluates a processing state of the respective sub-processor as a further input variable during its active phase and for the case where execution of the part program in the respective sub-processor is retained in a processing step of the part program on account of a constellation, in which a result of an operation depends on a time-variable result of another operation, the respective sub-processor is temporarily deactivated and the corresponding sub-processor can be reactivated by the control device as soon as the execution can be continued.

If, due to a so-called "race condition", the execution of the corresponding part program in a sub-processor cannot be continued, the sub-processor is temporarily deactivated. As soon as execution can be resumed, the control device reactivates the corresponding sub-processor again. Such unintentional race conditions of part programs are a common reason why, nevertheless, in a state in which it currently cannot continue, energy is consumed which could have been saved. In particular, this prevents an active waiting time in which clocking power of a processor is wasted without completion of computing tasks.

If it is desirable for the time required to restart a sub-processor, for example, when processing events such as a watchdog alarm, to be included in the timed sequences, then it is advantageous in the case of events which recur in a specific time interval and are assigned to a specific program block, to take account of a power-up time for the sub-processors assigned to the program blocks and to activate the corresponding sub-processors earlier by the power-up time. Since the power-up of the relevant sub-processor is now started earlier by the power-up time, the availability of the corresponding sub-processor with its associated part program is safeguarded in the event of a watchdog alarm.

Advantageously, in order to appropriately react to events which demand an extremely short response time, an event repetition rate is evaluated and when a predetermined rate is exceeded the corresponding sub-processor is permanently switched to the active state.

In order to minimize processing time when accessing data, the sub-processors access data in a common main memory in which the data are stored as global data blocks.

The object as stated at the outset is also achieved by an industrial controller having a processor for an executable control program, which is sub-divided into a main block and several program blocks. The program blocks are processed under event control, with a processing priority taken into consideration, such that the processor is embodied as a multi-core processor having a plurality of independent sub-processors, wherein a first sub-processor is embodied for the main block and the part program associated with the main block is executable within in, and wherein each of the additional sub-processors is embodied for at least one program block and the part programs associated with the program blocks are executable in the respective sub-processors. A control device has a first input for a processing priority of the respective program blocks and a second input for an event assigned to the respective program blocks, wherein the control device is embodied so as to switch the sub-processors into the active or inactive state, dependent upon the processing priority and the event. Since in this type of industrial controller sub-processors are specifically switched off or on, energy can be saved dependent upon the processing progress of the part programs.

In an advantageous embodiment, the industrial controller is embodied with a control device which is connected to the control device, wherein the control device is embodied so as to control the timed execution of the activation or deactivation of the sub-processors.

A further energy saving with regard to the industrial controller can be specifically achieved in that the control device has a third input for a processing state of the respective sub-processor during its active phase, wherein the control device is further embodied to temporarily deactivate the respective sub-processor, dependent upon the processing state and as soon as the processing can be continued the corresponding sub-processor is reactivated. This embodiment serves in particular to avoid an active waiting time, in which clocking power of a processor is wasted without completion of computing tasks.

However, despite the connection or disconnection of sub-processors, in order to react to events which demand an extremely short response time, the industrial controller is embodied with a pulse counter, which in turn is embodied to evaluate an event repetition rate and, on exceeding a predetermined rate, passes a switching command to the control device, wherein the control device in turn is embodied to permanently switch the corresponding sub-processor into the active state.

BRIEF DESCRIPTION OF THE DRAWINGS

An exemplary embodiment of the method for operating an industrial controller and of the industrial controller is explained in further detail in the drawing, where.

DETAILED DESCRIPTION OF THE PREFERRED EMBODIMENTS

Figure 1:
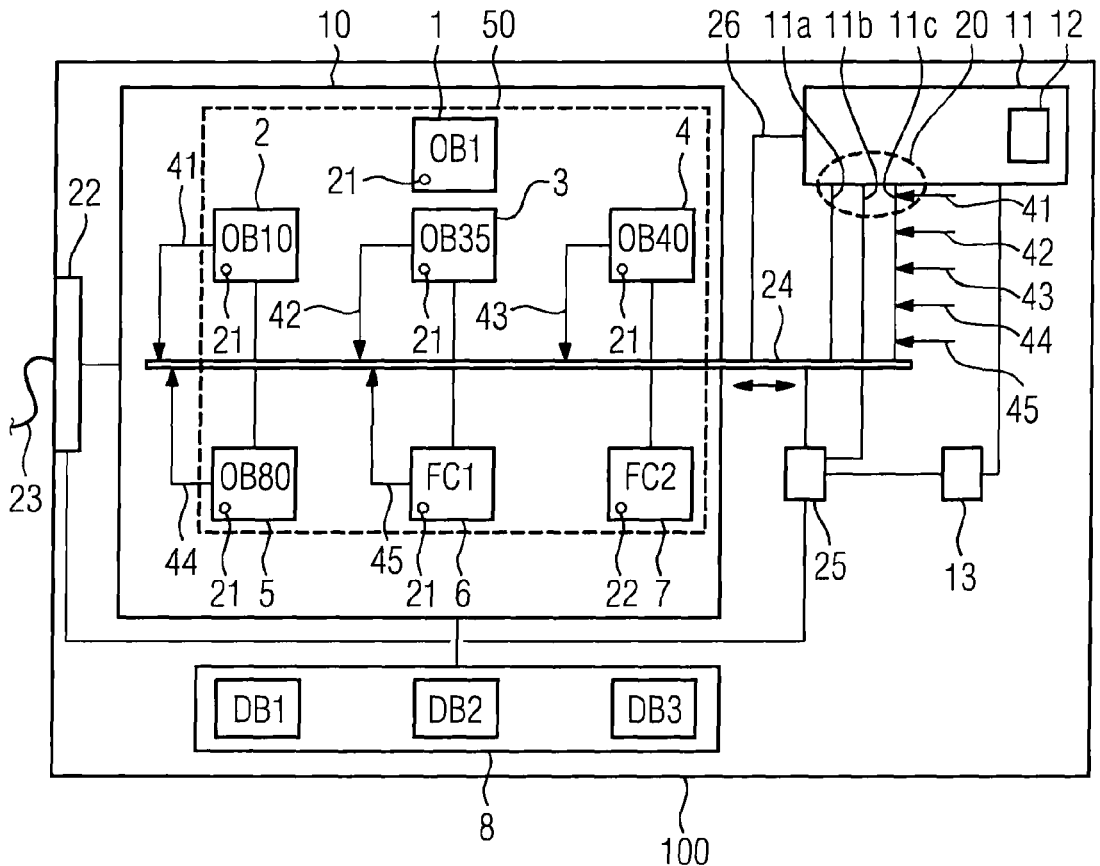
FIG. 1 shows an industrial controller having a multi-core processor in accordance with one embodiment of the present invention.

FIG. 1 shows an industrial controller 100 with a multi-core processor 10 for an executable control program 50. The multi-core processor is sub-divided into a main block OB1, a first program block OB10, a second program block OB35, a third program block OB40, a fourth program block OB80 as well as a first function block FC1 and a second function block FC2.

OB's are known to the person skilled in the art as so-called "Organization blocks" in programmable logic controllers. For example, there is an OB1 for processing basic functions, in particular for cyclical processing of other program sections, an OB10 for a time alarm, an OB35 for a periodic watchdog alarm, an OB40 for a process alarm of input/output modules which signal specific states of an I/O peripheral unit, an OB80 for a cycle-time error, for the case where a specifically-set cycle or time period is exceeded.

The control program 50 is sub-divided into different job-specific part programs, which in turn are assigned to the sub-processors. A first sub-processor 1 is embodied for (i.e., contained in) the main block OB1 and the part program associated with the main block OB1 is executable within it. A second sub-processor 2 is embodied for the first program module OB10 and the part program associated with the second program block OB10 is executable within it. A third sub-processor 3 is embodied for the second program block OB35 and the part program associated with the second program block OB35 is executable within it. A fourth sub-processor 4 is embodied for the third program block OB40 and the part program associated with the third program block OB40 is executable within it. A fifth sub-processor 5 is embodied for a fourth program block OB80 and the part program associated with the fourth program block OB80 is executable within it. A sixth sub-processor 6 is embodied for a first function block FC1 and the program function associated with the first function block FC1 is executable within it. A seventh sub-processor 7 is embodied for a second function block FC2 and the program function associated with the second function block FC2 is executable within it.

A processing priority 21 is assigned to all stated sub-processors 1-7. A processing priority can lie in the value range of 0 to 6, for example. Accordingly, a sub-processor having a low value of processing priority 21 is preferably dealt with before a sub-processor having a higher value of processing priority.

The industrial controller 100 has a control device 11 with a first input 11a for the processing priority 21 of the respective program blocks or sub-processors and a second input 11b for an event 31, 32, 33, 34, or 35 associated with the respective program blocks OB10, OB35, OB40, or 0B80. The control device 11 is embodied so as to switch the sub-processors 2-7 into the active or inactive states, dependent upon the processing priority 21 and the event 31, 33, 33, 34, or 35.

The processing priorities 21 of the sub-processors can be taken into account in a control device 12 which is connected to the control device 11 and is embodied to control the timed execution of the activation or the deactivation of the sub-processors 2-7.

The processing priority 21, the events 31-36 and a processing state 41, 42, 43, 44, or 45 of the respective sub-processors are combined as input variables 20 and supplied to the control device 11. The control device 11 can transmit commands to the multi-core processor 10 via a switching output 26, with the multi-core processor 10 being embodied to activate or deactivate the sub-processors 1-7 on the basis of the commands.

The sub-processors 1-7 are connected to an internal data bus 24 within the multi-core processor 10. The control device 11 can also access the internal data bus 24 by means of its switching output 26 and the control device 11 can also obtain the input variables 20 from the internal data bus 24.

The control device 11 has a third input 11c for a first processing state 41 up to a fifth processing state 45. The sub-processors 1-6 are embodied so that they can apply their processing state of a first processing state 41 of the second sub-processor 2, a second processing state 42 of the third sub-processor 3, a third processing state 43 of the fourth sub-processor 4, a fourth processing state 44 of the fifth sub-processor 5 and a fifth processing state 45 of the sixth sub-processor 6, to the internal data bus 24, in which case the processing states 41-45 reach the third input 11c and can be evaluated in the control device 11. Here the control device 11 is embodied so that it monitors the processing states 41-45 of the respective sub-processors 2-6 during its active phase, and at the same time, dependent upon the processing state 41-45 of the respective sub-processors 2-6, the control device 11 is further embodied to deactivate these only temporarily and reactivate them again as soon as processing can be continued. If, due to a constellation, processing of the part program is retained in the respective sub-processor 2, 3, 4, 5, or 6 in a processing step of the part program, in which an event of an operation depends on a time-variable event of another operation and, thus, cannot be currently further calculated, the respective sub-processor is temporarily deactivated and the corresponding sub-processor is reactivated for further calculation as soon as the processing can be continued.

Furthermore, the industrial controller 100 is embodied with a pulse counter 13, which is embodied to evaluate a repetition rate of the events 31-35 and to pass a switching command to the control device 11 if a predetermined rate is exceeded. The control device 11 is in turn embodied to permanently switch the corresponding sub-processor 2, 3, 4, 5, or 6 to the active state if the repetition rate is exceeded. Moreover, an event accumulator 25 is available to the pulse counter 13. On one hand, the event accumulator 25 is connected to the internal data bus 24 in order to record the current events 31-36 and, on the other hand, the event accumulator 25 is connected to an input/output interface 22, to which a bus 23 is connected, with process signals being supplied via the bus 23 to the input/output interface 22. Process events can therefore also be accumulated by the event accumulator 25 and supplied to the pulse counter 13.

A main memory 8 in which a first data block DB1, a second data block DB2 and a third data block DB3 are stored, is available to the sub-processors 1-7 for common data storage.

Figure 2:
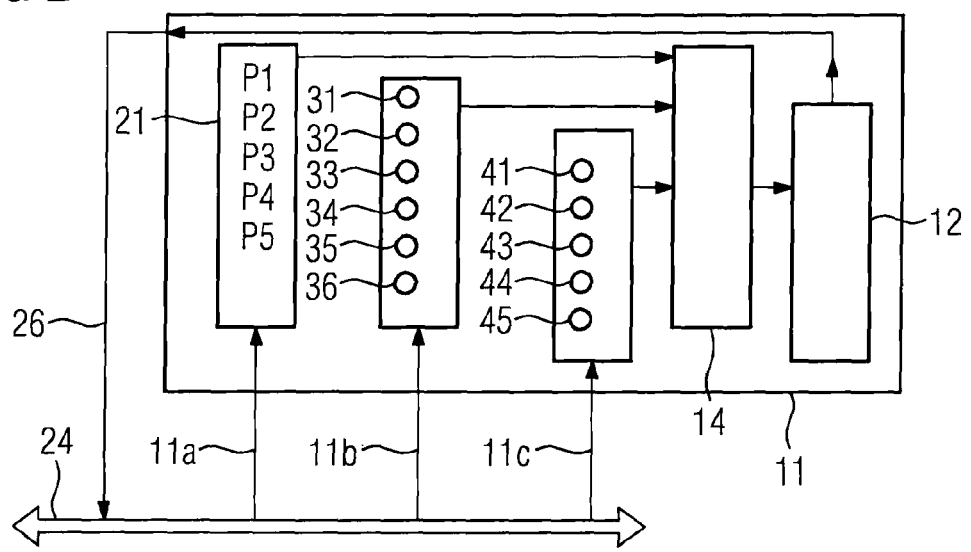
FIG. 2 shows a schematic construction of a control device for the multi-core processor in accordance with one embodiment of the present invention.

FIG. 2 represents a possible embodiment of the control device 11. The first input 11a, the second input 11b and the third input 11c are connected to the internal data bus 24. The control device 11 receives via the first input 11a a processing priority 21 associated with the respective sub-processors 1-7—i.e., a first processing priority B1 up to a fifth processing priority B5. The control device 11 receives via the second input 11b the events of the respective sub-processors, that is to say a first event 31 up to a sixth event 36 and the control device receives via the third input 11c the processing states of the respective sub-processors—i.e., a first processing state 41 up to a fifth processing state 45. These three stated variables jointly pass to an evaluation device 14 in which they are evaluated according to processing priority, event and processing state. The evaluated event is supplied to a control device 12, which is connected to a switching output 26. The control device 11 can pass switching commands via the switching output 26 to the internal bus 24 for the activation or deactivation of the sub-processors.

Energy can be saved in the industrial controller 100 by the specific activation or deactivation of the sub-processors 1-7.

Although the present invention has been described above with reference to preferred exemplary embodiments, it is not limited thereto but rather can be modified in a wide variety of ways. In particular, the invention can be altered or modified in multifarious ways without departing from the essence of the invention.

What is claimed is:

1. A method for operating an industrial controller, a control program executable in a processor arranged in the industrial controller being subdivided into a main block and several program blocks, the program blocks being processed under event control that takes a processing priority into consideration, and the processor including a multi-core processor having a plurality of independent sub-processors, the method comprising:
   assigning the main block to a first sub-processor;
   executing a program part associated with the main block in the first sub-processor;
   assigning each of the program blocks to additional sub-processors;
   executing program parts associated with the program blocks in respective sub-processors;
   operating a control device to evaluate as input variables the processing priority and an event assigned to a respective program block; and
   switching each of the plurality of independent sub-processors into one of an active state and an inactive state using an outcome generated by the control device from the evaluation of the input variables;
   wherein a repetition rate of events is evaluated and a corresponding sub-processor is permanently switched to the active state when a predetermined rate is exceeded.

2. The method of claim 1, further comprising:
   operating a control device to control a timed execution of the activation and deactivation of the plurality of independent sub-processors.

3. The method of claim 1, further comprising:
   operating the control device to evaluate as further input variables a processing state of the respective sub-processors during an active phase,
   wherein said switching step further comprises:
   deactivating a sub-processor when the program part running on the sub-processor is retained as a result of a configuration during which a result of an operation depends on a time-variable result of another operation; and
   reactivating the sub-processor when the running of the program part can be continued.

4. The method of claim 1, wherein events that recur in a specific time interval are assigned to a specific program block, wherein a start-up time for the sub-processors is assigned to the respective program blocks, and wherein the method further comprises:
   activating the corresponding sub-processor earlier based on the start-up time.

5. The method of claim 1, wherein the sub-processors access data in a common main memory in which the data are stored as global data blocks.

6. An industrial controller comprising:
   a processor for an executable control program which is sub-divided into a main block and several program blocks and including a multi-core processor having a plurality of independent sub-processors; the program blocks being operated under event control with a processing priority taken into consideration, and a first sub-processor being assigned to the main block for running a program part associated with the main block and each additional sub-processors being assigned to at least one program block for running program parts associated with program blocks;

a control device having a first input for a processing priority of the respective program blocks and a second input for an event assigned to the respective program blocks, the control device being adapted to switch each of the plurality of sub-processors into an active or inactive state based on the processing priority and the event; and a pulse counter adapted to evaluate a repetition rate of the events and to pass a switching command to the control device when a predetermined rate is exceeded;

wherein the control device is further adapted to permanently switch a corresponding sub-processor into the active state.

7. The industrial controller of claim 6, further comprising:
a control device connected to the control device and adapted to control a timed execution of an activation or deactivation of the sub-processors.

8. The industrial controller of claim 6, wherein the control device has a third input for a processing state of the respective sub-processor during its active phase, and wherein, dependent upon the processing state, the control device is furthermore adapted to temporarily deactivate the respective sub-processor and to reactivate the corresponding sub-processor when it can continue running the respective part program.

9. A method for operating an industrial controller, a control program executable in a processor arranged in the industrial controller being subdivided into a main block and several program blocks, the program blocks being processed under event control that takes a processing priority into consideration, and the processor including a multi-core processor having a plurality of independent sub-processors, the method comprising:

assigning the main block to a first sub-processor;
executing a program part associated with the main block in the first sub-processor;
assigning each of the program blocks to additional sub-processors;
executing program parts associated with the program blocks in respective sub-processors;
operating a control device to evaluate as input variables the processing priority and an event assigned to a respective program block; and
switching each of the plurality of independent sub-processors into one of an active state and an inactive state using an outcome generated by the control device from the evaluation of the input variables, events which recur in a specific time interval being assigned to a specific program block, and a start-up time for the sub-processors being assigned to respective program blocks; and
activating a corresponding sub-processor earlier based on the start-up time.

* * * * *